United States Patent [19]

Steiner et al.

[11] 4,196,174

[45] Apr. 1, 1980

[54] NICKEL SULFIDE PROCESS FOR THE REMOVAL OF H$_2$S

[75] Inventors: Peter Steiner; Carl Gutterman, both of Edison, N.J.

[73] Assignee: Foster Wheeler Energy Corporation, Livingston, N.J.

[21] Appl. No.: 873,823

[22] Filed: Jan. 31, 1978

[51] Int. Cl.$^2$ .............................................. B01D 53/34
[52] U.S. Cl. ................. 423/230; 423/561 R; 423/210.5
[58] Field of Search ............ 423/210.5, 230, 561, 423/DIG. 12; 252/411 S

[56] References Cited

U.S. PATENT DOCUMENTS

| | | | |
|---|---|---|---|
| 2,220,849 | 11/1950 | Riblett | 423/230 X |
| 2,551,905 | 5/1951 | Robinson | 423/236 |
| 3,690,808 | 9/1972 | St. Pierre | 431/4 |
| 3,954,938 | 5/1976 | Meissner | 423/210.5 |
| 4,039,619 | 8/1977 | Steiner | 423/230 |

FOREIGN PATENT DOCUMENTS 630042  11/1949  United Kingdom ..................... 423/561

*Primary Examiner*—G. O. Peters
*Attorney, Agent, or Firm*—Marvin A. Naigur; John E. Wilson; John J. Herguth, Jr.

[57] ABSTRACT

A continuous process for the selective removal of hydrogen sulfide from a hot gas stream containing hydrogen sulfide by contacting the effluent with particulate nickel or nickel oxide at a temperature whereby the hydrogen sulfide will react to form surface coatings of a sulfur/nickel liquid phase. The temperature of the system is maintained in a range so that the sulfur-containing liquid phase continuously drains off of the particulate solid phase exposing fresh surface areas for further reaction. The liquid phase separates from the solid phase, is removed from the reaction zone and collected for processing for recovery of nickel.

3 Claims, 4 Drawing Figures

NICKEL/SULFUR PHASE DIAGRAM

BREAKTHROUGH OF HYDROGEN SULFIDE vs. TIME

REMOVAL OF HYDROGEN SULFIDE FROM GAS USING NICKEL
CUMULATIVE SULFUR-LOADING CURVE

NICKEL SULFIDE PROCESS FOR THE REMOVAL OF H₂S

BACKGROUND OF THE INVENTION

Coal gasification processes which are designed to produce fuel gas also convert the sulfur present in the coal feedstock to hydrogen sulfide. Because of technical and environmental considerations, the hydrogen sulfide must be removed from the fuel gas and either converted to a useful product or neutralized as a hazardous material.

The presently available commercial processes for removing hydrogen sulfide were developed to process "sour" gas from refinery streams at near-ambient temperature. These processes use solvents, such as mono- and diethanolamine and hot potassium carbonate solution. The raw gas emerging from a coal gasifier may be at a temperature above 1500° F. When the commercial gas-cleaning processes operating at lower temperatures are integrated into an advanced gasification scheme, between the gasifier and a shift converter, a greater portion of the sensible heat contained in the raw gas cannot be recovered, resulting in a lower thermal efficiency for the overall process. Since pipeline gas production requires elevated temperatures for shift conversion and methanation—and it is preferable (necessary, in the case of methanation) to conduct these two steps after the hydrogen sulfide has been removed—a more efficient scheme would allow the gas to be desulfurized at the high temperatures at which it exits the gasifier, rather than using less efficient heat exchange to remove and then replace sensible heat. However, to date, no high temperature desulfurization process has advanced beyond the experimental stage to commercial practice.

SUMMARY OF THE INVENTION

This invention relates to a continuous process for the selective removal of hydrogen sulfide from a hot effluent gas stream. The hot effluent is passed through a packed bed of nickel or nickel oxide pellets, shavings, etc., reacting with the nickel to form surface coatings of a nickel/sulfur liquid phase. The reaction zone is maintained at a temperature whereat the hydrogen sulfide can diffuse into the nickel or nickel oxide forming a liquid phase which is sufficiently fluid to continuously drain from the solid phase nickel or nickel oxide, thereby continuously exposing fresh surfaces for reaction. The liquid phase or melt is allowed to drain from the packed bed, and collected and removed from the reaction zone. The nickel/sulfur melt may then be collected and transferred to a conventional smelting operation where, for example, it can be converted to nickel by roasting in the presence of an oxygen-containing gas.

Accordingly, it is an object of the present invention to provide a process for the removal of hydrogen sulfide from a hot gas stream.

Another object of the present invention is to provide a process for the removal of hydrogen sulfide from the effluent of a coal gasification process prior to further processing by methanation and shift conversion.

It is another object of the present invention to provide such a process wherein the desulfurization can be effected without first cooling the effluent or with minimal cooling and without need for reheating prior to feeding the desulfurized gas to the methanation and shift conversion.

Other objects and further scope of applicability of the present invention will become apparent from the detailed description to follow, taken in conjunction with the accompanying drawings.

DETAILED DESCRIPTION OF THE INVENTION

Figure 1:
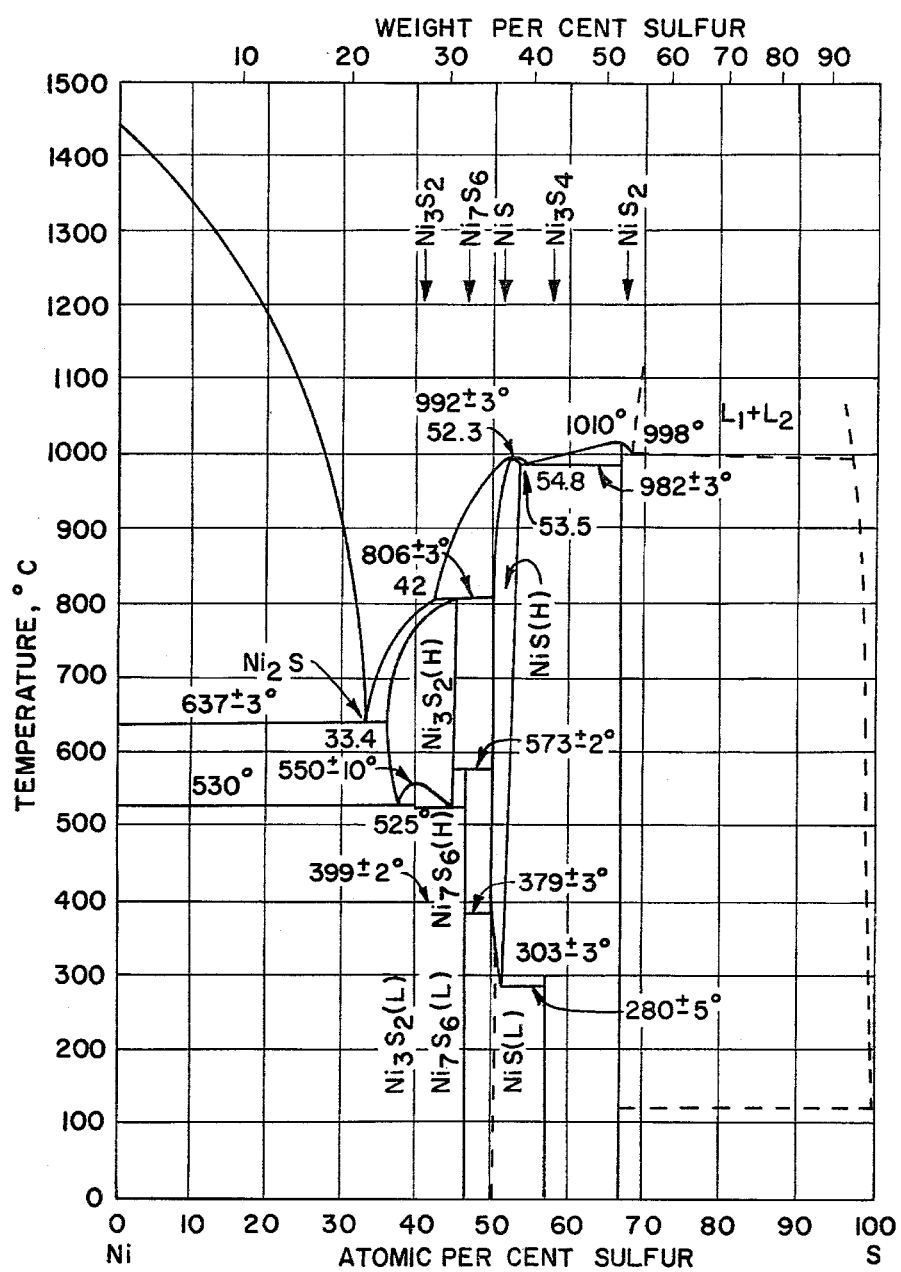
FIG. 1 is a nickel/sulfur phase diagram.

As previously noted, the present invention involves the removal of hydrogen sulfide from a reducing gas at a high temperature by contacting that gas with a packed bed of pellets, shavings, etc. of nickel or nickel oxide. The packed bed may be either a static bed or a moving bed. The preferred packing is sperical nickel pellets. The size of the pellets is not critical by typically the average diameter of the pellets will be between 3/16 and ⅜ inches. The only requirement for pellet size is that they must be large enough whereby a suitable pressure drop is maintained across the packed bed and large enough to avoid fluidization. Since the nickel or nickel oxide is used in the present invention, not as a catalyst but, rather, as a consumable reactant, a suitable bed height (dictated by the desired throughput, bed diameter and hydrogen sulfide removal efficiency) must be maintained by continuously or intermittently replenishing pellets.

Likewise, the shape of the pellets is not critical. Pebbles, spheres and cylindrical shapes are believed to be satisfactory, although shavings were used in the test described below.

The process described here can be suitably conducted at or near atmospheric pressure. It is believed that elevated pressures, for example, up to ten atmospheres, will provide some increase in the sulfur removal efficiency, but this advantage is at least partially offset by the need for apparatus capable of withstanding the higher pressures.

The selection of the proper temperature is an important aspect of the present invention. As can be seen from the phase diagram of FIG. 1, the first eutectic point for the nickel/sulfur system is 637° C. (1179° F.), at 21.5% by weight sulfur. Accordingly, it would be assumed advantageous to keep the temperature above but as close to this eutectic temperature as possible. Applicants have discovered that practical considerations dictate a reaction temperature of at least about 1350° F. At 1350° F., the liquid phase is sufficiently fluid to properly drain from the solid phase, allowing for temperature variations within the bed, and maintaining the pressure drop across the bed at a suitably low level. As the temperature of the bed is raised, the sulfur content of the forming liquid phase decreases. For example, at 900° C. (1652° F.) a sulfur content of 19% by weight will form in the liquid phase. At 1375° F. the liquid phase will contain about 21% by weight sulfur which is 97% by weight of the theoretical maximum. The preferred range is 1350°–1390° F. and about 1382° F. is considered optimum.

The packed nickel or nickel oxide bed is suspended on a grating, screen or other permeable support fabricated from material capable of withstanding the reaction temperature and sufficiently porous not to impede the draining of the liquid sulfur-containing phase.

The nickel or nickel oxide used in the present invention is of a solid homogeneous composition as contrasted with catalytic materials which are most often supported on an inert carrier.

The sulfur-containing liquid phase may be collected and allowed to cool in a suitable vessel or portion of the reactor situated beneath the support for the packed bed. Alternatively, the liquid phase can be continuously removed from the packed bed or from a point beneath the support for the packed bed. The sulfur-containing product, if desired, can be transferred to a conventional smelting process where it may be roasted in the presence of oxygen containing gas for recovery of the nickel and removal of the sulfur as a sulfur oxide.

The scientific rationale underlying the present invention becomes evident when the Ni-S phase diagram of FIG. 1 is examined. If a liquid-phase Ni-S compound with less than 21.5% by weight sulfur is cooled, a second, solid phase with 100% by weight nickel will appear when the temperature corresponding to the liquidus line is reached. As cooling continues more and more of the solid nickel phase will appear while the liquid phase will change in composition, becoming higher in sulfur content (determined by the liquidus line) until it reaches its eutectic sulfur concentration of 21.5% by weight at 637° C. (1179° F.). Below this temperature two solid phases exist.

The method of the present invention takes advantage of this portion of the phase diagram. If the nickel bed is kept above the eutectic temperature when the hydrogen sulfide reacts with it, a liquid phase forms with a sulfur concentration corresponding to the point on the liquidus line at that temperature. The highest possible concentration, 21.5% weight, is that corresponding to the eutectic temperature of 1179° F.

By way of illustration of the present invention, a bench-scale test is described below to illustrate an embodiment of the present invention by way of example. However, it is emphasized that the following description is by way of example only and is not meant as a definition of the invention, that definition being provided by the appended claims.

EXAMPLE

Figure 4:
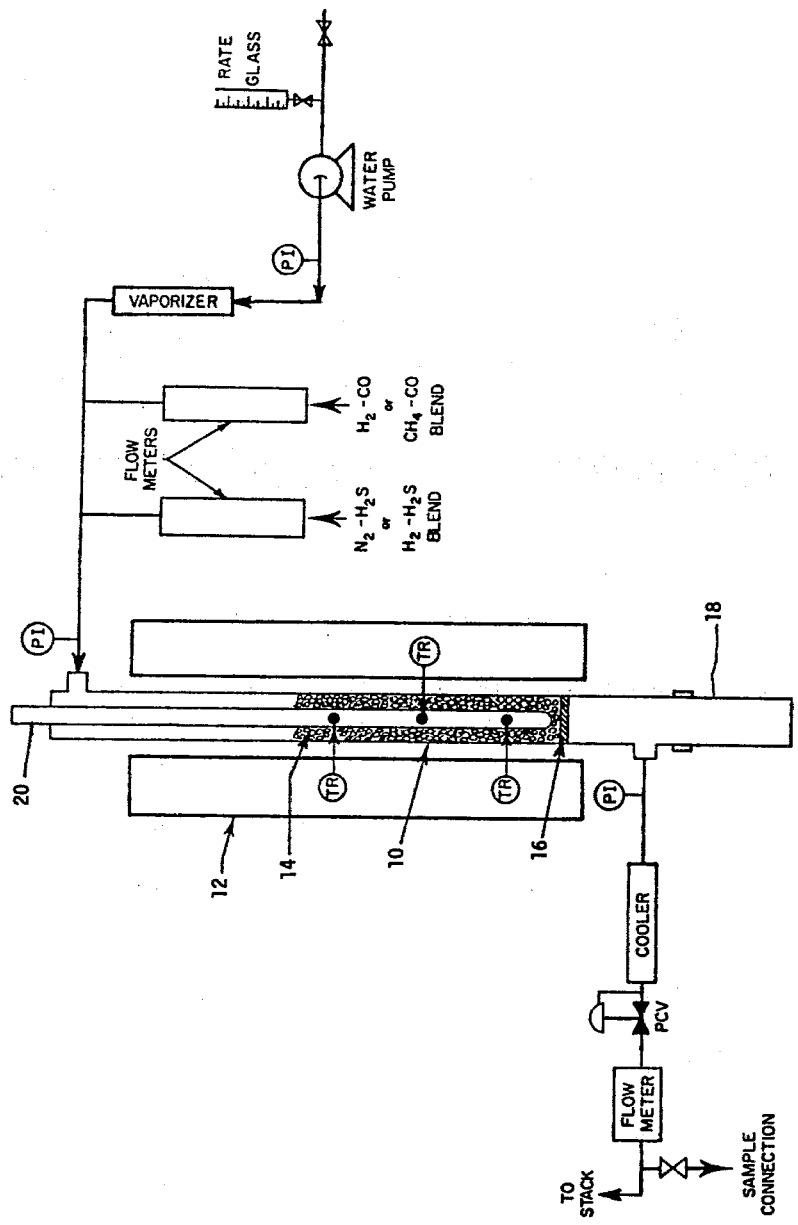
FIG. 4 is a schematic illustration of the bench-scale test apparatus used for the test described herein.

The test described here employed bench apparatus as illustrated in FIG. 4. FIG. 4 shows the reactor 10 mounted within a vertical electric tube furnace 12. The reactor 10 contains a bed of nickel shavings 14 supported on a screen 16. A vessel 18 is provided beneath the screen for collection of the nickel/sulfur melt. The reaction temperature is monitored by means of a thermocouple housed within a thermowell 20 provided in the center of the reactor.

The reactor contents were heated to and maintained at an average temperature of about 1280° F. and a gas having the following composition typical of a coal gasification product was introduced:

$N_2$—68.3
CO—15.2
$H_2$—14.3
$H_2O$—1.7
$H_2S$—0.46.

Figure 2:
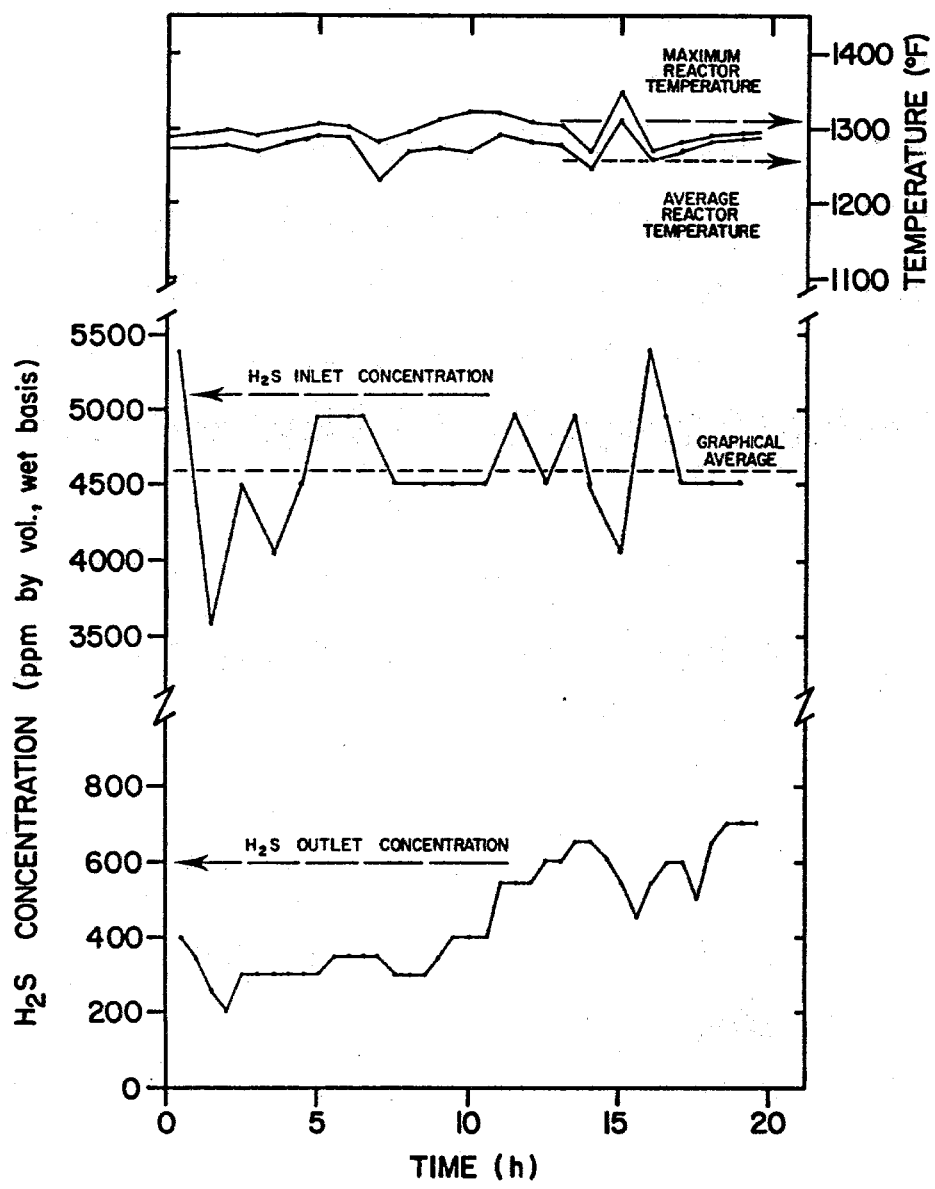
FIG. 2 is a graph of data obtained in accordance with the present invention employing a bench-scale reactor.
Figure 3:
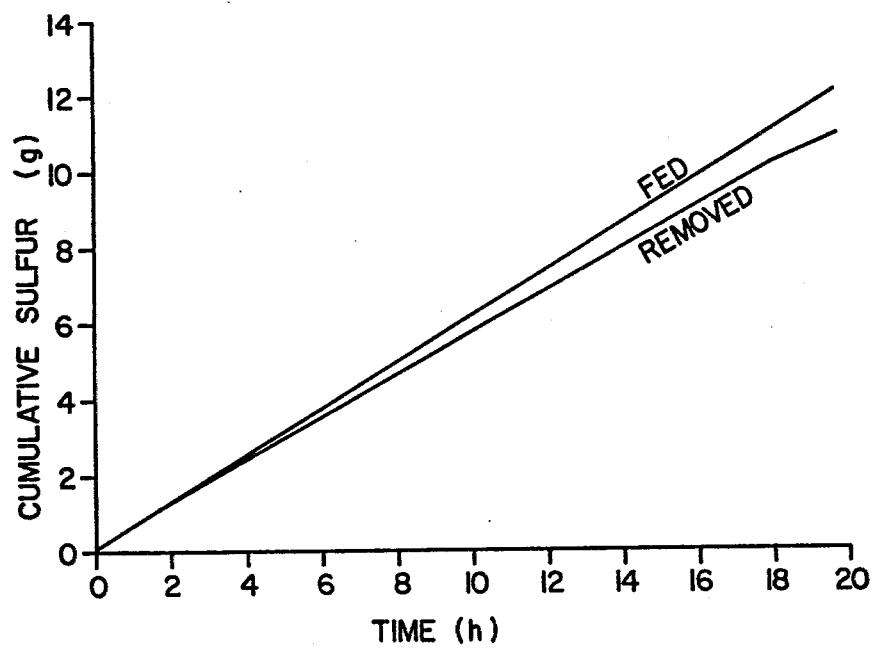
FIG. 3, like the foregoing, summarizes date obtained with the fixed bed bench-scale test apparatus.

At a 0.8 second gas residence time, the above synthesized gas stream with a nominal 4600 ppm by volume hydrogen sulfide was processed for nine hours, resulting in an overall removal efficiency of 93%. After 19.5 hours, the overall removal efficiency was still over 90%, i.e., 90.4%. The nickel utilization was 96.2% based on 100% utilization being equivalent to 20% by weight of sulfur in the product. The nickel/sulfur product which collected in the vessel 18 was analyzed and found to contain 18.7% by weight sulfur. This figure was considered to be in good agreement with, and a reasonable approach to, the theoretical phase-diagram composition. The instantaneous efficiency at the end of the run was 84.8%. The results of the run are shown in FIG. 2 and FIG. 3.

What is claimed is:

1. A process for the selective removal of hydrogen sulfide from a hot gas containing same, said process comprising:
    (a) contacting the hydrogen sulfide-containing gas in a reaction zone at a temperature of 1350° F.–1390° F. with a packed bed of particulate nickel or nickel oxide whereby the hydrogen sulfide reacts with said particulate nickel or nickel oxide to form a surface coating of a nickel/sulfur liquid phase;
    (b) continuously draining said liquid phase from the solid phase nickel or nickel oxide thereby continuously exposing fresh solid phase surfaces for further reaction; and
    (c) continuously collecting said liquid phase and removing it from said reaction zone.

2. The process of claim 1 wherein said particulate nickel or nickel oxide is in the form of pellets having an average diameter of at least 3/16 inch.

3. The process of claim 2 wherein said pellets are generally spherical in shape.

* * * * *